Aug. 31, 1948.	T. G. CARRIE	2,448,079
CONNECTING ROD ASSEMBLY FOR
INTERNAL-COMBUSTION ENGINES
Filed Jan. 20, 1945	5 Sheets-Sheet 4

INVENTOR
THOMAS G. CARRIE
By
ATTORNEY.

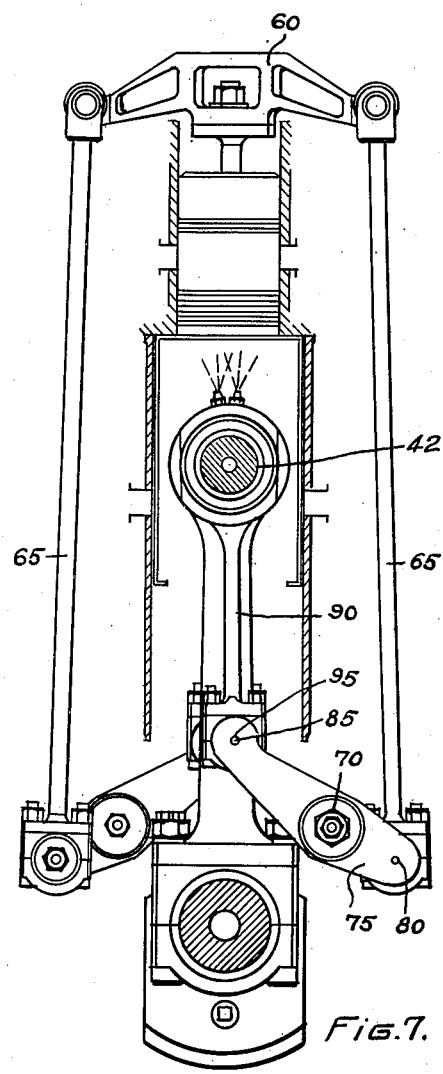
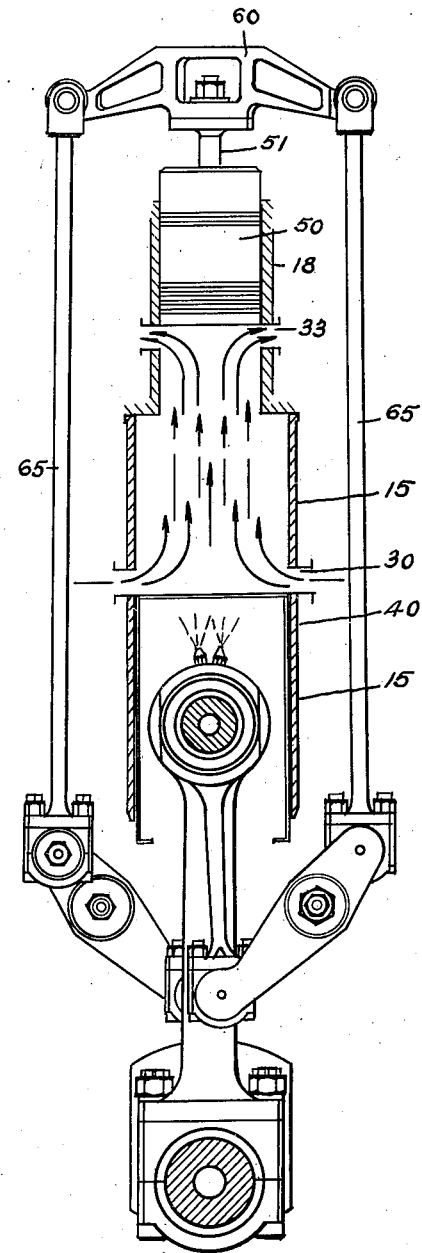

Patented Aug. 31, 1948

2,448,079

UNITED STATES PATENT OFFICE 2,448,079

CONNECTING ROD ASSEMBLY FOR INTERNAL-COMBUSTION ENGINES

Thomas G. Carrie, Montreal, Quebec, Canada

Application January 20, 1945, Serial No. 573,650
In Canada October 14, 1944

1 Claim. (Cl. 123—176)

Introduction

This invention relates to internal combustion engines and more specifically to Diesel engines.

A principal object of the present invention is to provide an internal combustion engine introducing new features in design and operation permitting an increase in efficiency over engines at present in use. It is a further object of the invention to provide an engine of this type capable of being made in small and medium capacities. Other objects will make themselves apparent from the following description.

The invention

With these and other objects in mind, a preferred Diesel engine according to the present invention includes a number of cylinders each having a piston valve chamber in line therewith, a piston in each cylinder and in each valve chamber, a piston valve of considerably smaller diameter than the piston, the piston being linked to the crank shaft by a connecting rod, the piston valves being connected to the piston end of the connecting rod through a yoke, valve rod, rocker arms and drag links whereby upward movement of the piston valve is converted into a downward thrust on the connecting rod. The piston and the piston valve thus work together in creating an opposed piston effect. Other special features are provided for scavenging fuel injection, lubrication and cooling and the engine housing and frame is of unique construction as will become evident from the detailed description to follow.

Detailed description

This preferred embodiment of the invention is disclosed more fully by reference to the accompanying drawings in which:

Figure 7 is a diagrammatic view illustrating the operation of the engine showing the piston and piston valve at the conclusion of the compression stroke.

Figure 8 is a view similar to Figure 7 showing the piston and piston valve at the conclusion of the power stroke.

Engine housing and frame

Figure 1:
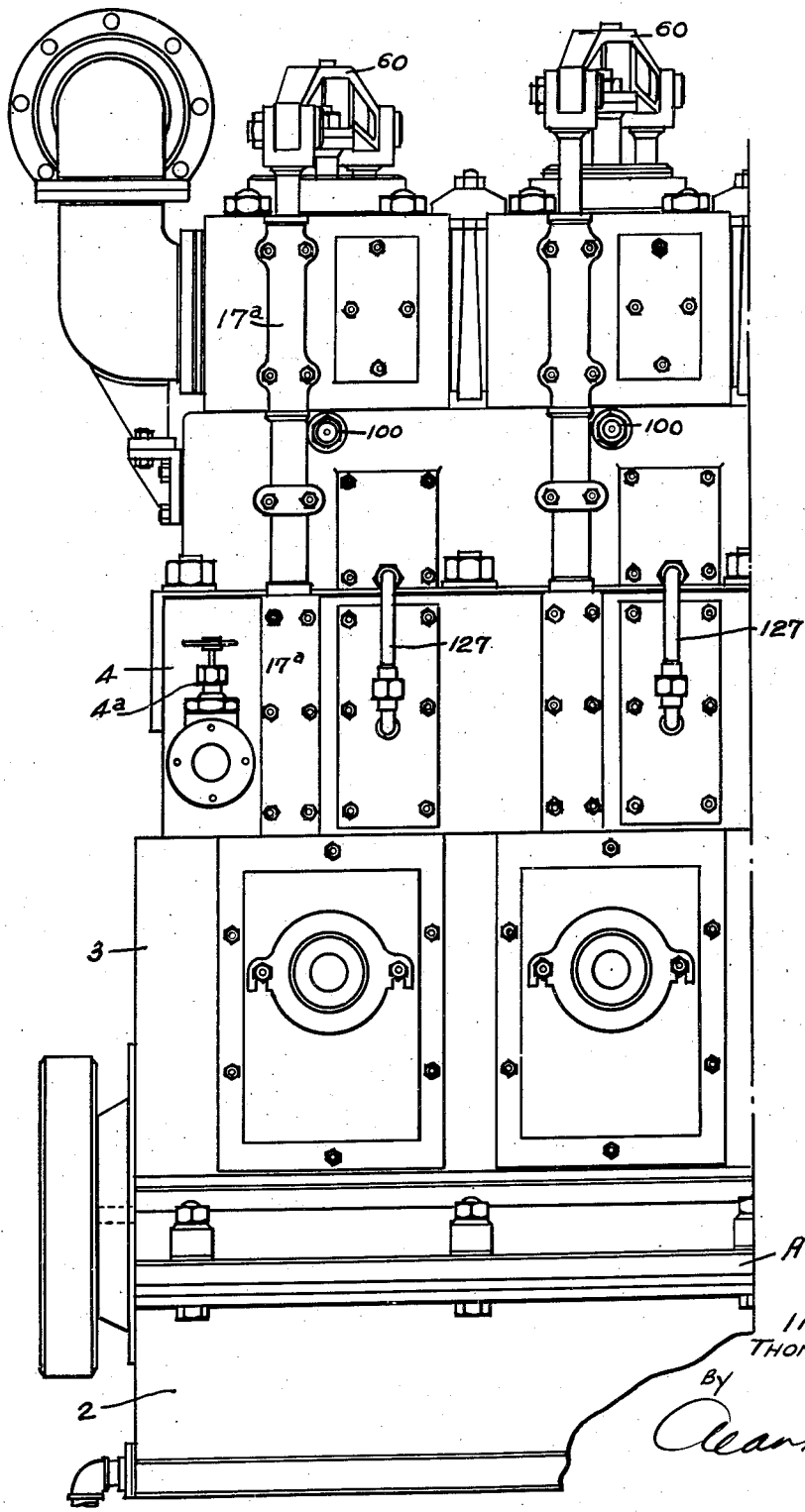
Figure 1 is a fragmentary vertical elevation of the left-hand side of the Diesel engine.
Figure 2:
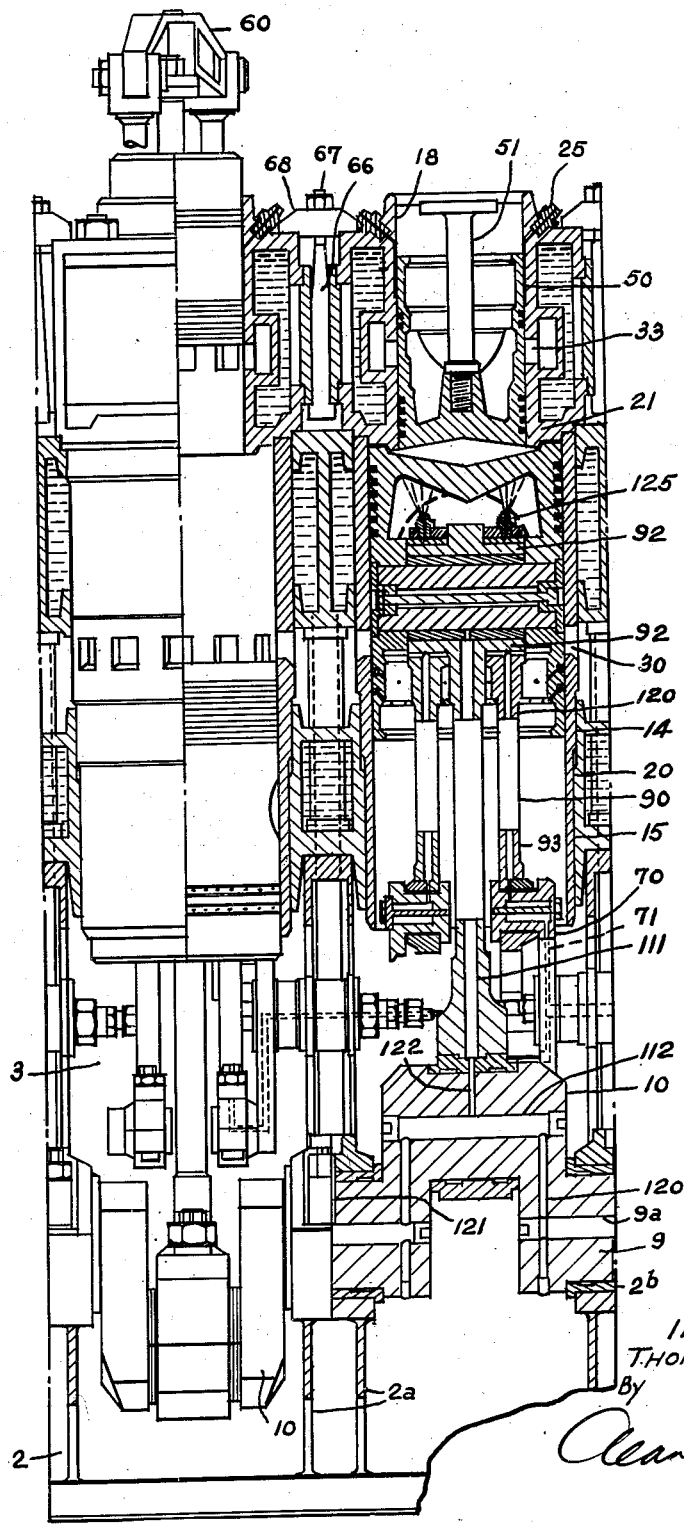
Figure 2 is a fragmentary vertical section (in continuation of Figure 1) through the right-hand portion of the engine shown in Figure 1.
Figure 3:
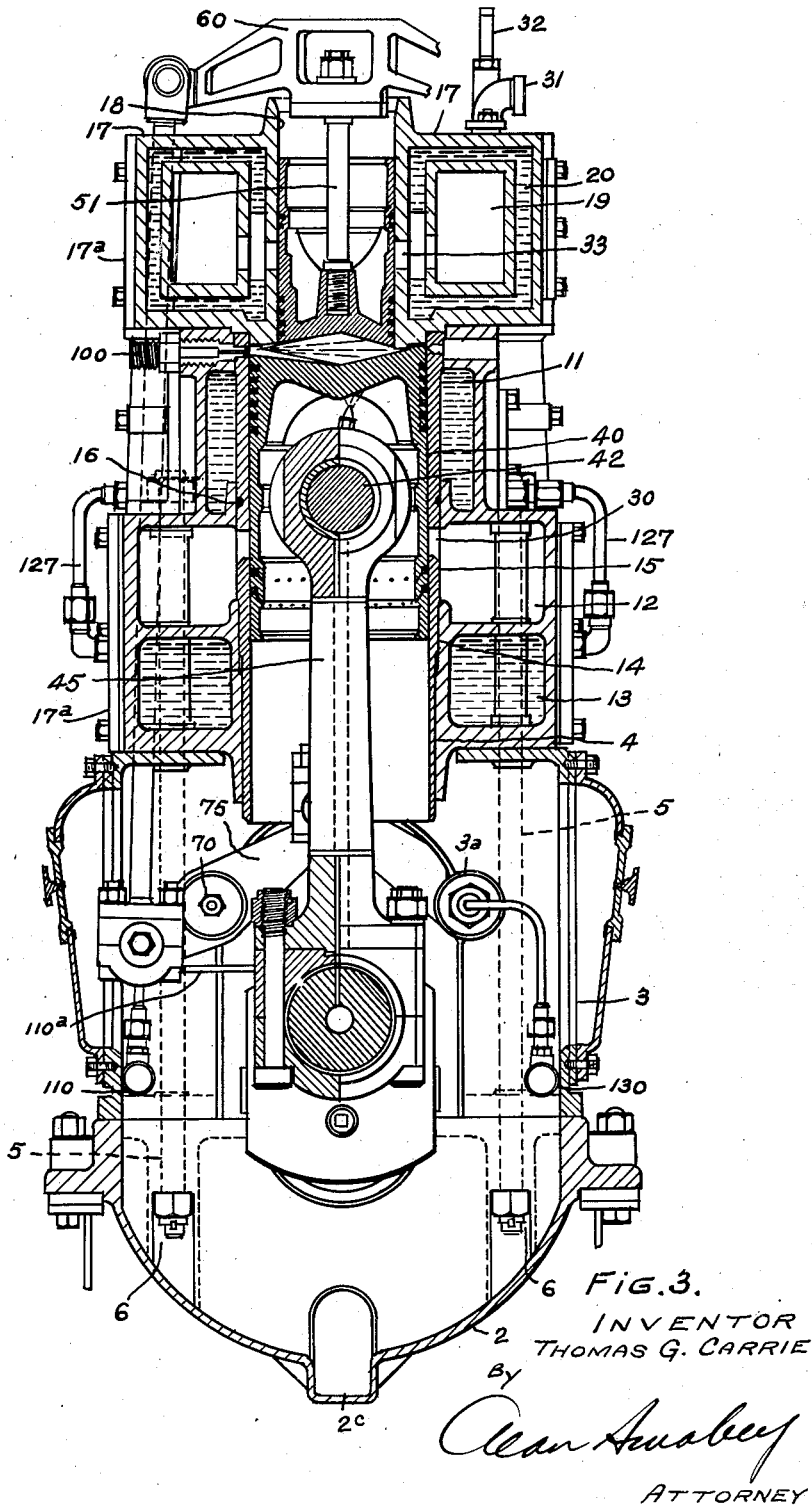
Figure 3 is a transverse vertical cross-section through one of the cylinders of the engine shown in Figures 1 and 2.
Figure 4:
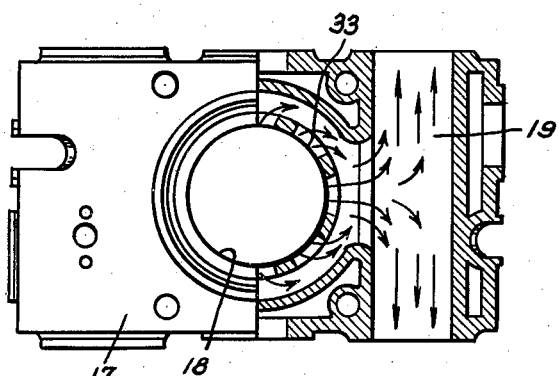
Figure 4 is a plan view in half-section of the cylinder head showing the piston valve cylinder and internal exhaust header.
Figure 6:
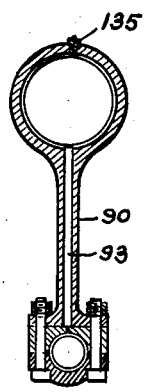
Figure 6 is a cross-section through one of the drag links.
Figure 5:
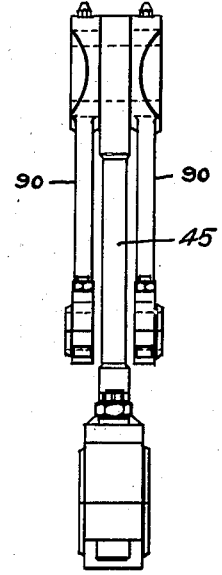
Figure 5 is an elevation of one of the connecting rods and associated drag links.

Referring more particularly to the drawings, the engine includes three major castings, a base plate 2, a crank case 3 and a cylinder block 4 which are all tied rigidly together by long tie bolts 5 and nuts 6. The tie bolts are placed two at each end of the engine and two between each pair of cylinders relieving the castings of tension strain and securing the engine into a rigid unit.

The bed plate 2 extends the entire length of the engine and consists of two heavy angle sections tied together by double-web cross members 2a which carry the crank shaft in babbitt lined steel bearings 2b and extend to the bottom of the oil pan which is integral. A channel 2c running along the bottom of the oil pan drains from both ends of the engine to a sump tank. The tie rods 5 are anchored between the double webs of the cross members 2a.

The crank case 3 is a rectangular box section with double web cross members that conform with the bed plate cross members. Bosses 3a are cast between the webs of the cross pieces to contain the fulcrum pins 70 for the valve gear. Ample doors are provided on each side permitting easy access to the crank case and main bearings. A quick-opening inspection door is mounted on each of the crank case doors.

The cylinder block 4 is of rigid box section. Cylinder jackets 11 and air manifolds 12 are cast in the block. Spaces for the jackets 11 and the manifolds 12 are completed when the liners are inserted. The lower part of the cylinder block 4 forms a sediment chamber or water header 13 that is common to all the cylinders. Sleeves 14 are cast in the sediment chamber to receive cylinder liners 15 which are secured at the top end only and are thus free to expand and contract in the cylinder block. A rubber sealing ring 16 prevents leakage from the cylinder jackets to the air spaces. The sediment chamber 13 is self-contained and sealed by the sleeve carrying the cylinder liner 15.

Recesses or housings for valve rods are cast in the cylinder block and provided with convenient covers 17a for easy access. Large doors at the back and front of the cylinder casting provide for easy cleaning and inspection of all internal spaces and surfaces. The external surfaces are all flat and together with the enclosures present a pleasing, clean-cut appearance of modern design and construction.

Each cylinder is provided with scavenging ports 30 which are cast in the cylinder liner at the bottom of the piston stroke filling the entire periphery of the liner and communicating directly with the scavenging air manifold 12. The scavenging air manifold 12 is spaced between the cooling water head or sediment chamber 13 and the cylinder jackets and is, therefore, water cooled.

There are also provided a water jacket supply line 127, a water jacket discharge line 31 and a thermometer 32.

The cylinder heads 17 which are cast singly, form a single piece casing of unique design and contain the piston valve cylinder 18 and exhaust manifolds 19 in a common water jacket 20.

The piston valve cylinder 18 forms the center of the head and is cast between the exhaust manifolds 19 which extend across the back and front of the head. Cross passages between the manifolds pass around the sides of the valve chamber enclosing the exhaust ports 33 which fill the entire periphery of the piston valve chamber making both manifolds common. The exhaust manifolds are jointed between the cylinder heads by taper steel flanges 66 drawn up by a single bolt 67 and bridge piece 68 spanning the adjacent cylinder heads. Ample doors are provided on all sides of the head for cleaning out the water spaces. A feature of the engine is the casting of symmetrical design having a uniform and equal distribution of metal throughout to guard against unequal expansion and contraction due to hot spots and local over-heating. A study of the figures clearly shows the outstanding features and simplicity of design.

Working parts

A crank shaft 9 having cranks 10 is suitably supported in the crank case 3. A piston 40 is mounted for movement within each cylinder liner 15. Mounted in each cylinder liner 15 is a piston 40. To the piston 40 is connected, through a wrist pin 42, a connecting rod 45 which in turn is connected to the crank 10 thus enabling the crank shaft to be driven from the piston.

Mounted for travel in the valve chamber 18 is a piston valve 50 in the form of an inverted piston. The piston valve 50 is connected through a rod 51 with a yoke 60. To each end of the yoke 60 is connected a downwardly extending valve or side rod 65, the valve rods operating respectively at the back and front of the engine. Carried on a fulcrum pin 70 on the main casting at each side of the piston is a rocker arm 75. The rocker arms 75 are located inside the crank case and the fulcrums are carried on bosses cast between the double webs of the crank case members. The rocker arms are designed to transmit one-half the piston stroke to the piston valve. A drag link 90 connects the inner end of each rocker arm 75 directly to the top end of the connecting rod and operates on an arbor 92 at the side of the eye of the rod.

By the arrangement described, the piston valve 50 is so connected to the connecting rod 45 that upward movement of the piston valve 50 is translated through the yoke 60, connecting rods 65, rocker arm 75 and drag links 90 into a downward thrust on the connecting rod 45. Thus, a modified "opposed" piston effect is obtained with a single crank and no eccentrics eliminating the use of a piston rod, crosshead and guide bars thereby the weight and number of working parts is reduced and the overall engine height greatly shortened. Placing a valve or side rods at back and front of the cylinder greatly reduces the cylinder pitch, an important factor in a multi-cylinder engine.

Fuel injection

Fuel is injected to each cylinder horizontally by a single jet nozzle 100 spraying into the air mass contained in the combustion chamber formed between the concave top of the piston and the concave bottom of the piston valve.

Lubricating system

Forced feed lubrication is used throughout. A gear pump (not shown) driven from the crank shaft discharges to a lubricating oil header 110 which extends along the engine inside the crank case. Branch pipes 110a extend from the header to each main bearing. The oil passes from the main bearing to the crank pin and up the connecting rod to the piston pin.

A small hole 9A through the center of the crank shaft and a small hole 112 through the crank pin connects with holes 120 drilled through the crank webs. These holes are blocked at the outer ends by screw-plugs inserted in the crank webs forming a continuous oil passage through the entire length of the crank shaft. Oil is fed through holes 121 from the periphery of the crank shaft journals into the center of the shaft. Holes 122 in the crank pins allow the oil to flow from the crank shaft to the crank bearings and up passage 111 in the connecting rod to the piston pin.

Thus, the crank shaft becomes a supplementary lubricating oil header or common rail and no particular bearing is dependent on its own particular pipe. The clogging up or stoppage of one or more branch pipes on the lubricating oil header would have little or no effect on the efficient lubrication of the engine. This method of lubrication also ensures a degree of crank shaft cooling by passing cool oil through the crank shaft.

Piston cooling

The piston cooling system is a duplicate lubricating oil system with a cooling oil header 130 extending along the engine on the opposite side of the crank case. A separate pump having a separate drive supplies the cooling header. The pumps and their drives being separate, the engine can operate at full capacity, unimpaired by the partial or total break-down of either one of the lubricating oil pumps. Cross-connection valves are provided for this purpose. Both pumps take their suction from the sump tank and deliver through duplicate filters and an oil cooler to the respective (or both) oil headers.

Branch pipes from the cooling header supply oil to the fulcrum pins 70 of the valve gear which passes through drilled holes 71 to both ends of the rocker arms and up through channels 93 in the drag links to sprayers 125. The drag links serve as pipes to carry the oil from the rocker arms to the sprayers after passing around the top end bearings. The sprayers 125 are located at the top of the drag links a little to the side of the center line so that the oil ejected by the sprayers is played with equal distribution over the crown area by the oscillation of the drag links.

Cooling system

Cooling water is supplied by a pump driven from the crank shaft and led to the sediment chamber 13 through a valve 4a placed at the end of the cylinder casting. The sediment chamber acts as a cooling water header and is common to all the cylinders. Two external pipes 127, one at the back and one in front, lead the cooling water from the top of the sediment chamber to the bottom of the respective cylinder jackets. These pipes communicate with the cylinder jackets on diagonally opposite sides so as to impart a spiral flow to the water passing upwards around the cylinder liner. Four rubber sealed internal pipes on each cylinder allow the cooling water to flow from the top of the cylinder jackets to the cylinder heads. A thermometer and cooling water discharge valve conveniently located on the cylinder heads affords easy means of regulating the flow of water through the respective cylinders and of maintaining a uniform discharge temperature.

Operation

In operation the piston valve 50 begins to open the exhaust ports 33, 70° before bottom dead center or 20° before the piston begins to open the scavenging air ports 30. Between the positions "exhaust opening" and "scavenging opening," i. e. 20° of the crank orbit, the piston has uncovered the exhaust port 33 by an inch or so, greatly reducing the cylinder pressure which is further reduced by the sudden temperature drop due to the rapid cooling of the exhaust gases as they escape from the cylinder. The scavenging ports 30 open 50° before bottom dead center or 20° after the exhaust port opening 33 has greatly reduced the cylinder pressure, allowing a large volume of cold air at low pressure to enter the scavenging air port 30 and flow through the cylinder in a single direction expelling any remaining burnt gases out through the exhaust ports 33. As the piston valve 50 is operated from the connecting rod 45, the closing of the scavenging and exhaust ports are in the same relation to the crank as the opening, but reversed in order. The scavenging ports 30 close 50° after bottom dead center or 20° before the exhaust ports 33 close, giving equal compression and effective strokes of 110°.

Since the piston valve 50 is operated from the connecting rod 45 and travels only one-half the piston stroke, it follows that, in operation, only one-half the load on the piston valve is transmitted by the connecting rod to the engine and is effective for twice the length of the valve travel, i. e. the whole length of the piston stroke. Inversely, only one-half the compression load on the piston valve during the compression stroke is effective on the engine thereby allowing the engine to operate at a high compression ratio with the increased cylinder volume added by the piston valve "opposed piston" effect.

Moreover, since the load on the piston valve 50 is transmitted directly to the connecting rod 45 by the drag links 90 it exerts no stress or strain on the piston 40 or on the piston pin 42. The load on the drag links 90 is always equal and opposed in force and direction, therefore balancing and eliminating side thrust or cross head effect on the piston.

Advantages

It is, therefore, seen that this engine operating on a two-cycle uniflow scavenging principle introduces new features in design and operation. It is particularly adapted to cover the field for small and medium capacity Diesel units from 50 to 1200 H. P. depending on the size and number of cylinders. The advantages may be summarized as follows:

(1) Uniflow scavenging is obtained by a "valve-in-head" engine giving a modified "opposed piston" effect with a single crank and without eccentrics or cam shafts.

(2) The elimination of a piston rod, cross head and guide bars greatly reduces the overall engine height and weight allowing for higher speeds.

(3) Practically perfect scavenging is obtained by the unique design of the cylinder head in which the "piston valve" chamber and the exhaust manifold form an integral part and communicate directly without extended or restricted exhaust passages. This design allows a free and uninterrupted flow of the exhaust gases from the cylinder to the exhaust manifolds, and provides a very extensive area of cooling surfaces, thus further increasing scavenging efficiency by the rapid cooling of the exhaust gases as they are expelled from the cylinder.

(4) Smooth running is ensured by the inherent balance of the engine and centering the major stresses low in the engine housing. Only one-half the cylinder pressure is exerted on the cylinder head while the load on the piston valves is taken up by the fulcrum pins located between the double web frames of the crank case.

(5) Only half the load on the piston valve is exerted on the engine and is effective the whole length of the piston stroke, thereby allowing the engine to operate at a high compression ratio with increased cylinder volume due to the opposed piston effect of the piston valve.

(6) Work is performed on the engine by the piston valve which develops, in one preferred form of engine, approximately 22% of the rated engine horse power.

(7) The elimination of all spring return cam and roller operated mushroom valves.

It will be understood that, without departing from the spirit of the invention or the scope of the claim, various modifications may be made in the specific expedients described. The latter are illustrative only and not offered in a restricting sense, it being desired that only such limitations shall be placed thereon as may be required by the state of the prior art.

I claim:

A connecting rod assembly for internal combustion engines, comprising, a connecting rod having a portion adapted to encircle the wrist pin of a piston, said portion having an arbor projecting from each side thereof, a pair of drag links each having an eye adapted to engage one of said arbors, the end of each drag link remote from the arbor being adapted to be connected with a rocker arm, each drag link having a sprayer on the end thereof adjacent the arbor, connecting oil passages in each drag link leading from the point of connection with the rocker arm to the sprayer, said connecting rod having an eye remote from said portion and adapted to engage a crank, said connecting rod having a channel leading to said eye, an opening in said eye communicating with said passage in the connecting rod whereby oil may be transmitted from the crank case to the wrist pin.

T. G. CARRIE.

REFERENCES CITED

The following references are of record in the file of this patent:

UNITED STATES PATENTS

| Number | Name | Date |
| --- | --- | --- |
| 995,857 | Fullagar | June 20, 1911 |
| 1,112,263 | Chatain | Sept. 29, 1914 |
| 1,823,399 | Hemmingsen | Sept. 15, 1931 |
| 1,936,159 | Finch | Nov. 21, 1933 |
| 2,106,939 | Wilcken | Feb. 1, 1938 |
| 2,159,197 | Barraja-Frauenfelder | May 23, 1939 |
| 2,270,849 | Maxwell | Jan. 27, 1942 |
| 2,299,506 | Sheppard | Oct. 20, 1942 |

FOREIGN PATENTS

| Number | Country | Date |
| --- | --- | --- |
| 320,002 | Great Britain | Oct. 3, 1929 |